US006008627A

United States Patent [19]
Narita

[11] Patent Number: 6,008,627
[45] Date of Patent: Dec. 28, 1999

[54] OVERVOLTAGE PROTECTION CIRCUIT FOR A BATTERY PACK

[75] Inventor: Izuru Narita, Sagamihara, Japan

[73] Assignee: International Business Machines Corporation, Armonk, N.Y.

[21] Appl. No.: 09/036,811

[22] Filed: Mar. 9, 1998

[30] Foreign Application Priority Data

May 12, 1997 [JP] Japan ................................. 9-120449

[51] Int. Cl.⁶ ............................................. H01M 10/46
[52] U.S. Cl. ............................................. 320/134; 320/136
[58] Field of Search ................................. 320/116, 118, 320/132, 134, 136

[56] References Cited

U.S. PATENT DOCUMENTS 5,581,170  12/1996  Mammano et al. ..................... 320/116

*Primary Examiner*—Edward H. Tso
*Attorney, Agent, or Firm*—Bernard D. Bogdon

[57] ABSTRACT

A battery pack and an electric/electronic apparatus capable of reliably preventing an overvoltage from being applied to the battery pack without burning a fuse in the electric/electronic apparatus off. The battery pack comprises a battery cell such as a Lithium ion secondary battery, a charge current preventing FET1, a discharge current preventing FET2, a discharge current detecting resistor R2, and a FET control circuit for controlling the FET1 and the FET2, and is characterized in that the FET control circuit detects the value of the current flowing through the battery cell based upon the voltage across the resistor R2, and turns the discharge current preventing FET2 and the charge current preventing FET1 off when the discharge current $I_{discharge}$ increases to a value which is equal to or larger than the predetermined voltage $I_{th}$.

5 Claims, 5 Drawing Sheets

6,008,627

OVERVOLTAGE PROTECTION CIRCUIT FOR A BATTERY PACK

FIELD OF THE INVENTION

The present invention relates to a battery pack and an electric/electronic apparatus using a battery cell, such as Lithium ion battery etc. More particularly, the present invention relates to a battery pack containing an overvoltage protection (OVP) circuit for preventing an overvoltage from being applied to the battery, and an electric/electronic apparatus using the battery pack.

BACKGROUND OF THE INVENTION

A small and light weight type electric/electronic apparatus, such as a notebook type computer for portability reasons, has become popular. Most of the electric/electronic apparatuses are capable of mounting a packaged battery (referred to as a battery pack, hereinafter) to operate them in locations where a commercial power source is not available. The battery pack mounted in the notebook type computer is charged through an AC adapter when the notebook type computer is connected to the commercial power source.

A charge/discharge operation of the battery pack is controlled by a charge controller provided within the notebook type computer. For example, the charge controller integrates a discharge current from the battery pack, and starts the charge operation to the battery pack when the charge controller detects that the remaining capacity of the battery pack has been reduced to a predetermined value, and the charge controller integrates a charge current to the battery pack at the charge operation and stops the charge operation when the charge controller detects that the battery pack is charged to a full charge state. The charged battery pack operates as a main power source of the notebook type computer to supply the power to each section of the computer when the notebook type computer is disconnected from the commercial power source.

It is known that a Lithium (Li) ion battery has been broadly used as the battery cell of the battery pack, since the Lithium ion battery generates a high energy density per weight and volume, and generally provides a reduction in size and weight of a portable type apparatus. However, the Lithium ion battery has a safety problem that its performance characteristic is degraded when it is charged by an overvoltage, and hence the design of the charging circuit and the overcharge protection circuit becomes important.

FIG. 4 shows a block diagram of a prior power supply circuit of the electric/electronic apparatus into which the battery pack is mounted. In the FIG. 4, a reference numeral 10 shows an AC adapter for converting a voltage of the commercial power source to a predetermined DC voltage, a reference numeral 11 shows the Lithium ion battery pack, a reference numeral 12 shows a charge device for charging the Lithium ion battery pack 11 to a full charged state when the DC voltage is supplied from the AC adapter 10, reference numerals 13 and 14 show a diode for preventing a reverse flow of current, a reference numeral 15 shows a DC/DC converter for converting a DC voltage from the AC adapter 10 or the Lithium ion battery pack 11 to a predetermined DC voltage (5V and 3.3V, for example) used in the electric/electronic apparatus to supply it to the apparatus, and a reference numeral 17 shows an OVP (Over Voltage Protection) circuit for preventing an overvoltage from being supplied to the Lithium ion battery pack 11. A reference numeral 18 shows a terminal for connecting the AC adapter 10 to the electric/electronic apparatus, and a reference numeral 19 shows a terminal for connecting the Lithium ion battery pack 11 to the electric/electronic apparatus. The terminal 18 includes a ground potential terminal, and the terminal 19 includes a voltage supply terminal, a ground potential terminal and a control terminal for performing the charge/discharge control, although these are not shown in the figure. The FIG. 5 shows one example of a circuit of the above OVP circuit 17.

In the FIG. 5., the OVP circuit 17 contains a SCR (Silicon Controlled Rectifier) 1, a voltage regulator diode ZD1, a resistor R1 and a fuse F1. A positive terminal of the battery pack 11 is connected to an anode of the SCR1 and a cathode of the ZD1, a cathode of the SCR1 is connected to a negative terminal of the battery pack 11 through the fuse F1, and an anode of the ZD1 is connected to the negative terminal of the battery pack 11 through the resistor R1 and the fuse F1. A gate terminal of the SCR1 is connected to a node A between the ZD1 and the resistor R1, and a voltage potential level at the node A between the ZD1 and the resistor R1 is applied to the gate terminal of the SCR1.

In the above construction, when an overvoltage is applied to the battery pack 11, the voltage regulator diode ZD1 turns on to raise the potential level at the node A by which the SCR1 turns on. When the SCR1 turns on, a discharge current I from the battery pack 11 flows through the fuse F1 to burn the fuse off (blow the fuse), so that the protection of the battery pack 11 from the overvoltage is performed.

Notwithstanding, the battery pack and the electric/electronic apparatus provided with such prior OVP circuit have caused the following problem. That is, although the overvoltage protection is reliably performed by burning the fuse F1 off, it is required for further use of the electric/electronic apparatus to replace the burned fuse F1 by a new fuse F1 since the fuse F1 is burned off each time that the OVP circuit is operated. Generally, the exchange of the fuse F1 is classified as a repair of the electric/electronic apparatus, and hence a process and a cost for sending the electric/electronic apparatus to a service center is required. The above overvoltage may be caused by other trouble, such as a solder ball or other electrically conductive particles accidentally contacted to the terminal portions, than the inherent described problem. Since such case was treated as the repair of the electric/electronic apparatus, it is a burden on users and the repair center. Also, it was required for burning the fuse F1 off to flow a large current from the battery pack, and hence the battery cell included in the battery pack is adversely affected.

SUMMARY OF THE INVENTION

It is the object of the present invention to provide a battery pack and an electric/electronic apparatus which reliably perform the overvoltage protection for the battery pack without burning the fuse, contained within the electric/electronic apparatus, off.

A battery pack in accordance with the present invention comprises a battery cell; an electric circuit for controlling charge/discharge of the battery cell; a charge preventing switch controlled by the electric circuit for preventing a charge current from flowing into the battery cell; a discharge preventing switch controlled by the electric circuit for preventing a discharge current from flowing from the battery cell; and a detecting means for detecting the discharge current are integrally packaged; the electric circuit being operable to turn both the discharge preventing switch and the charge preventing switch off when an overvoltage is applied to the battery pack and a discharge current based upon the overvoltage is detected by the detecting means. The charge preventing switch and the discharge preventing switch are FETs.

An electric/electronic apparatus mounted with the battery pack in accordance with the present invention comprises an overvoltage preventing circuit for detecting a supply of an overvoltage to the battery pack and preventing burning a fuse off by supplying a discharge current from the battery pack to the fuse at the detection of the overvoltage to prevent the battery pack from being charged, and is characterized in that a value of the discharge current for burning the fuse off is larger than a value of the discharge current detected by the battery pack based upon the overvoltage by a predetermined value.

DETAILED DESCRIPTION OF THE PREFERRED EMBODIMENTS

The battery pack in accordance with the present invention can be applicable to a battery pack used into an electric/electronic apparatus, such as a notebook type computer.

Figure 1:
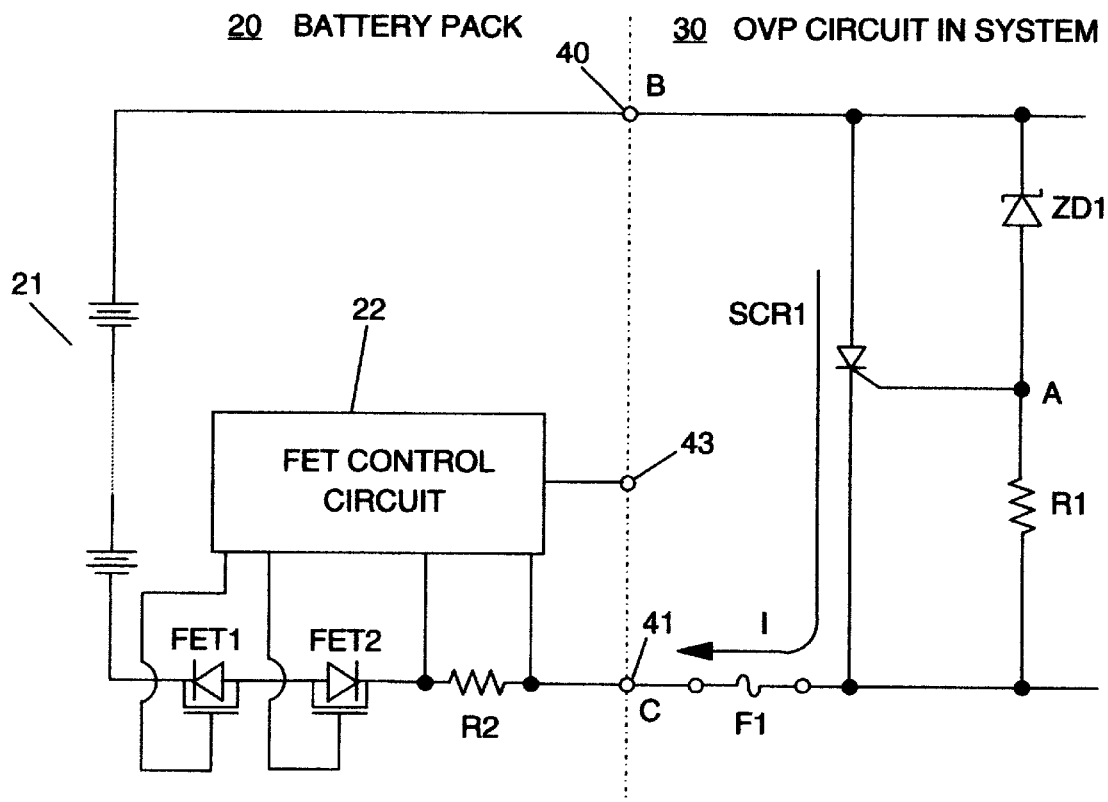
FIG. 1 is a block diagram showing the battery pack in accordance with the present invention and the OVP circuit of the electric/electronic apparatus.
Figure 5:
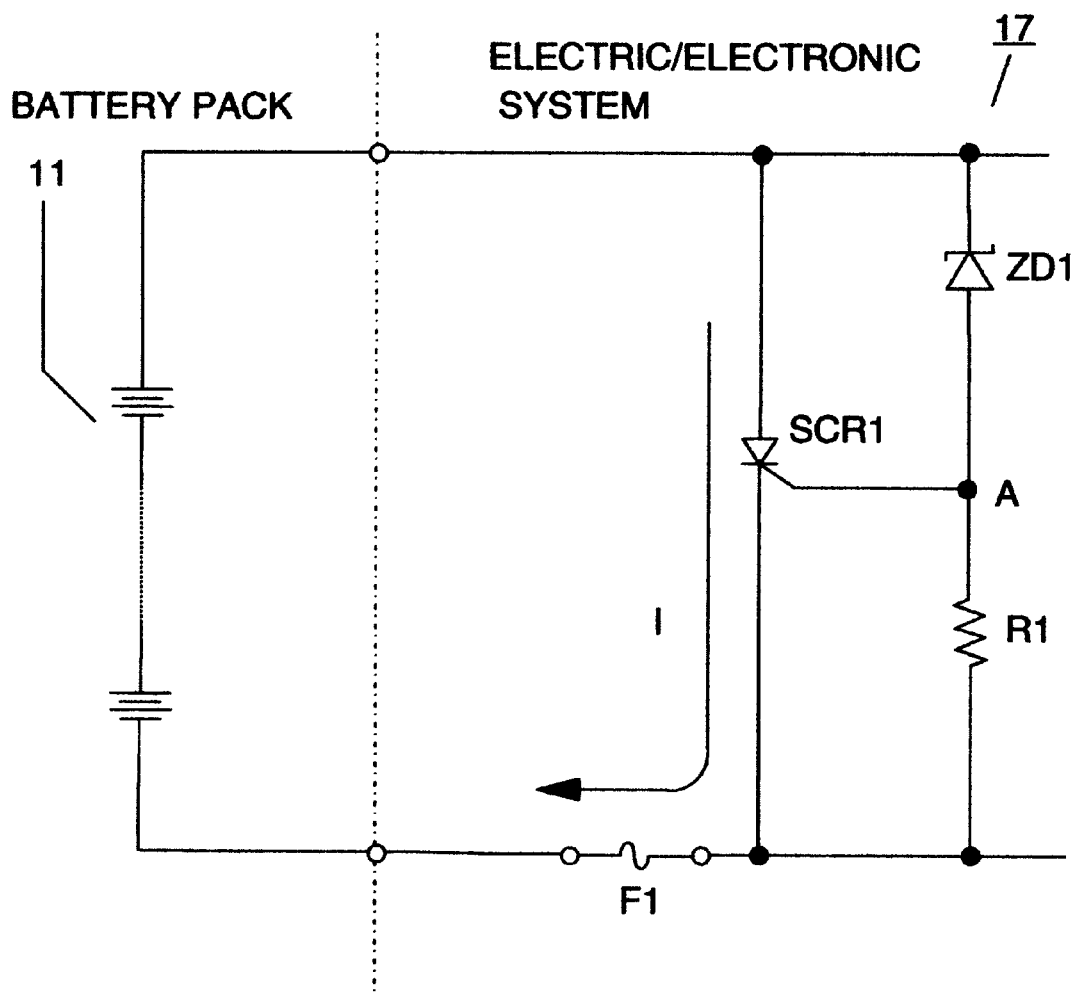
FIG. 5 is a circuit diagram showing the construction of the prior OVP circuit.

The FIG. 1 is a block diagram showing a constitution of an embodiment of an over voltage protection (OVP) circuit of a battery pack and an electric/electronic apparatus in accordance with the present invention. The elements in the FIG. 1 which are the same as that shown in the FIG. 5 are provided with the same reference numerals in describing the battery pack and the electric/electronic apparatus of the present invention.

Description of the symbols in the Figures include 20 . . . battery pack; 21 . . . battery cell; 22 . . . FET control circuit; 30 . . . OVP circuit; 40 . . . positive terminal; 41 . . . negative terminal; 43 . . . communication terminal; FE T1 . . . charge current preventing FET; FET2 . . . discharge current preventing FET; R2 . . . discharge current detecting resistor; SCR1 . . . thyristor; ZD1 . . . voltage regulator diode; R1 . . . resistor; and F1 . . . fuse.

In the FIG. 1, a reference numeral 20 shows the battery pack, and a reference numeral 30 shows the OVP circuit included in a main body of the electric/electronic apparatus, and the battery pack 20 and the OVP circuit 30 are connected each other through a positive terminal 40, a negative terminal 41 and a communication terminal 43. The battery pack 20 is constituted by a battery cell 21, such as a Lithium ion rechargeable battery, a charge current preventing FET1, a discharge current preventing FET2, a discharge current detecting resistor R2 and a FET control circuit 22 for controlling the FET1 and the FET2.

Both the ends of the resistor R2 are connected to the FET control circuit 22, to detect an amplitude of a current flowing through the battery cell 21 as a signal of a voltage level at the discharge of the battery pack 20. The charge current preventing FET1 is a charge preventing FET or switch, and when the FET1 is turned off by the FET control circuit 22, a charge current can not be flowed into the battery cell 21. The discharge current preventing FET2 is a discharge preventing FET or switch, and when the FET2 is turned off by the FET control circuit 22, a discharge current can not flow from the battery cells 21. The gate terminals of the FET1 and the FET2 are connected to the FET control circuit 22, and the turn on/off of the FET1 and the FET2 are controlled by the FET control circuit 22. Also, the FET control circuit 22 is connected to the communication terminal 43 for informing the electric/electronic apparatus or system, to which the battery pack 20 is connected, of the state of the battery pack 20.

The FET control circuit 22 is constituted by an electric circuit for controlling the charge/discharge operation, and controls the turn on/off of the FET1 and the FET2 based upon a value of a detected discharge current $I_{discharge}$. This control operation will be latter described with reference to the FIGS. 2 and 3. Although the FET control circuit 22 is constituted by the electric circuit for controlling the charge/discharge operation in the present embodiment, it can be replaced by a controller using a microprocessor for executing programs. Main functions of such controller are to manage a timing of the start or the stop of the charge/discharge and a past history, and to inform the system of the state of the battery pack 20. The controller performs the function of the turn on/off control of the embodiment.

The OVP circuit 30 is constituted by the SCR1, the voltage regulator diode ZD1, the resistor R1 and the fuse F1. An anode of the SCR1 and a cathode of the ZD1 are connected to the positive terminal 40 (a node B) of the battery pack 20, and a cathode of the SCR1 is connected to the negative terminal 41 (a node C) of the battery pack 20 through the fuse F1, and an anode of the ZD1 is connected to the negative terminal 41 through the resistor R1 and the fuse F1. A gate terminal of the SCR1 is connected to a node A between the ZD1 and the resistor R1 to supply a voltage level at the node A to the gate terminal of the SCR1.

Generally, the battery pack for the Lithium ion battery is provided with a circuit for preventing an excess charge/discharge which corresponds to the FET1, the FET2, the voltage converting resistor R2 and the FET control circuit 22. However, the prior battery pack merely turns the FET1 off for stopping the charge current, and merely turns the FET2 off for stopping the discharge current, and does not perform the control of the FETs as described in the present embodiment.

The operation of the battery pack and the electric/electronic apparatus of the present invention constituted as described above is described below. It is assumed that an overvoltage due to an error operation of the charger in the system is applied to the positive terminal 40 or the node B of the battery pack 20. When the overvoltage applied to the node B exceeds a breakdown voltage of the ZD1, the ZD1 conducts to raise up the voltage level at the node A by which the SCR1 is turned on, so that a current I shown in the FIG. 1 flows.

In the prior circuit, this discharge current I simply burns the fuse F1 off.

In the embodiment of the present invention, before the fuse F1 is burned off, the FET control circuit 22 detects an amplitude of the current flowing through the battery cells 21 based upon a voltage across the resistor R2, and turns the discharge current preventing FET2 off when the value of the current increases to a value which is equal to or larger than a predetermined current value. In this manner, in the case that the battery pack 20 is connected to the electric/electronic apparatus, the FET control circuit 22 always detects the voltage across the resistor R2, and when the circuit 22 detects that the current flowing through the battery cell 21 increases to a value which is equal to or larger than the predetermined current value, the circuit 22 turns the discharge current preventing FET2 off before the fuse F1 is burned off. The FET control circuit 22 also turns the charge current preventing FET1 off at substantially the same time as the turn off of the discharge current preventing FET2 as shown in sequence in the flow chart of FIG. 2. In this manner, since the FET1 has already turned off even if the overvoltage state occurs, the battery pack 20 can be electrically disconnected from the electric/electronic apparatus, and hence battery pack 20 is not applied with the overvoltage.

Figure 2:
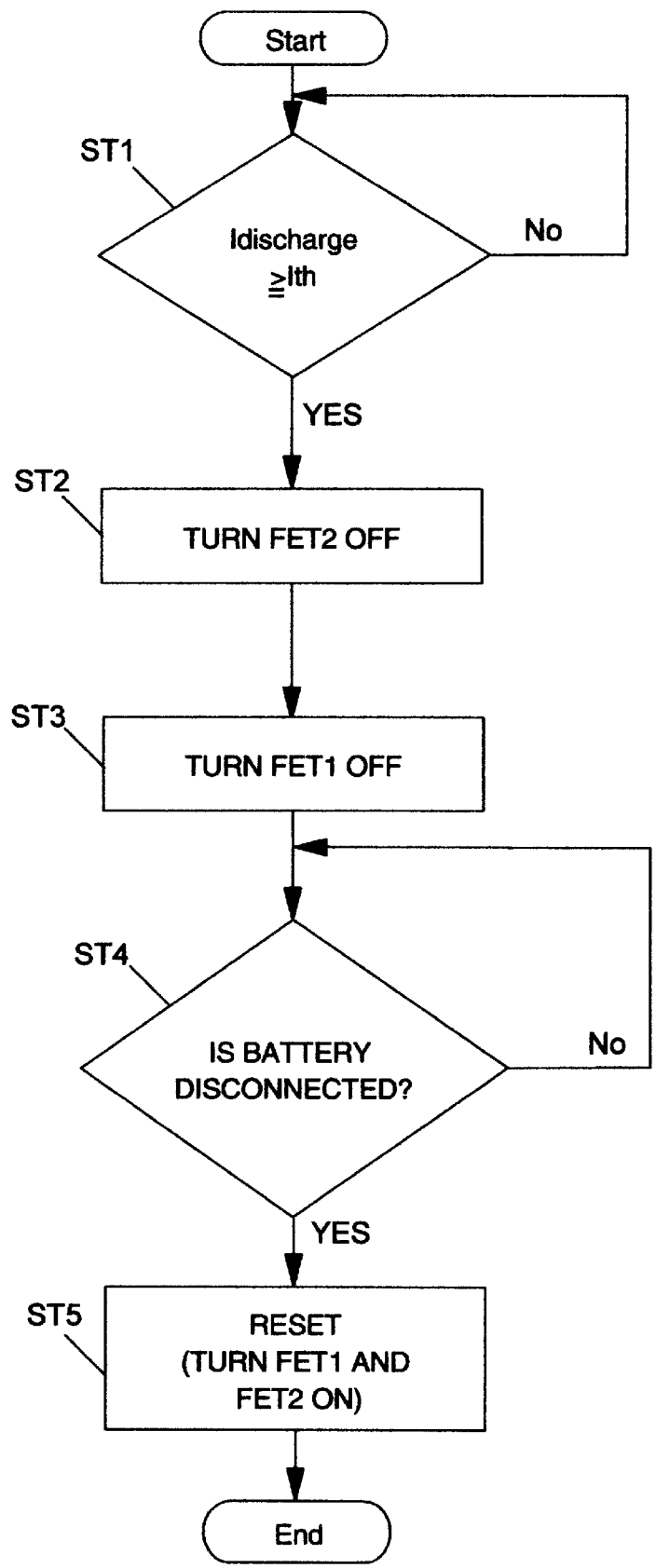
FIG. 2 is a flow chart showing the on/off control operation of the FETs by the FET control circuit of the battery pack.

The FIG. 2 is a flow chart showing the on/off control the FETs in the FET control circuit 22, and ST in the FIG. 2 represents a step in the operational flow.

At first, in the step ST1, the FET control circuit 22 detects an amplitude of the current flowing through the battery cell 21 based upon the voltage across the resistor R2, and determines as to whether the discharge current $I_{discharge}$ is equal to or larger than a predetermined current value $I_{th}$, or not. When the discharge current $I_{discharge}$ reaches a value equal to or larger than the predetermined current value $I_{th}$, the FET control circuit 22 turns the discharge current preventing FET2 off in the step ST2, and turns the charge current preventing FET1 off in the step ST3.

Figure 3:
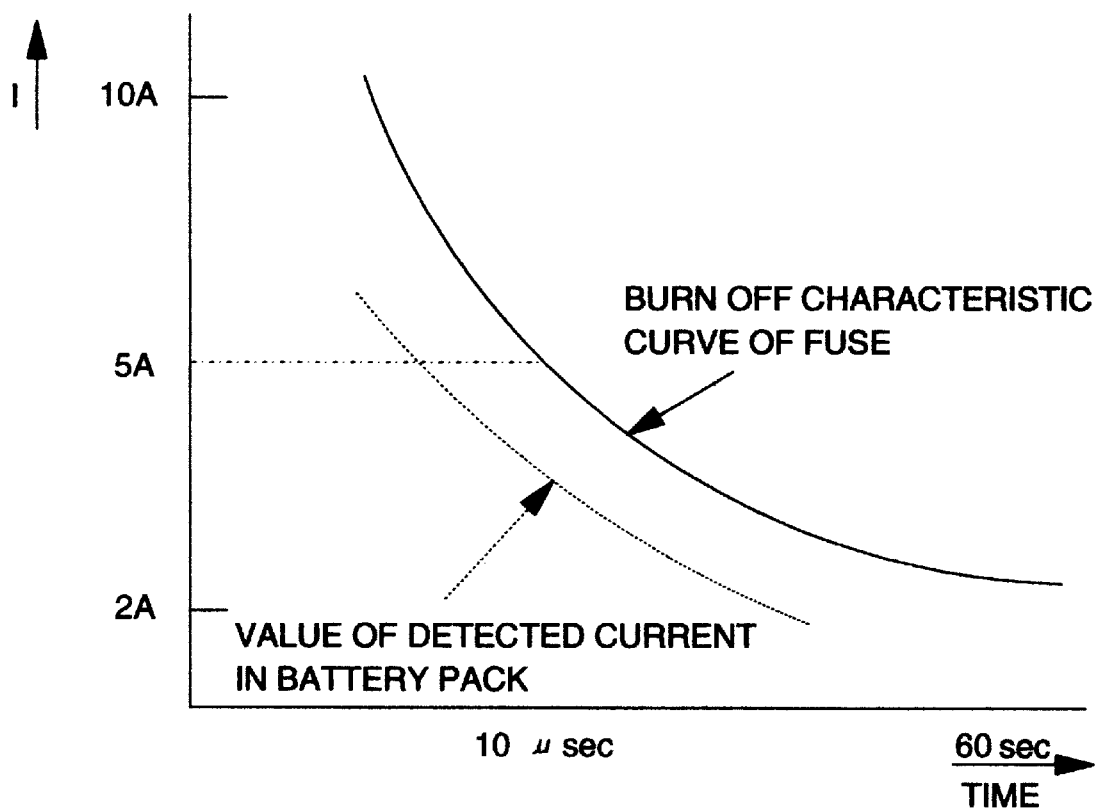
FIG. 3 shows the characteristic curve of the burn off of the fuse of the OVP circuit of the electric/electronic apparatus and the value of the detected current in the battery pack in accordance with the present invention.
Figure 4:
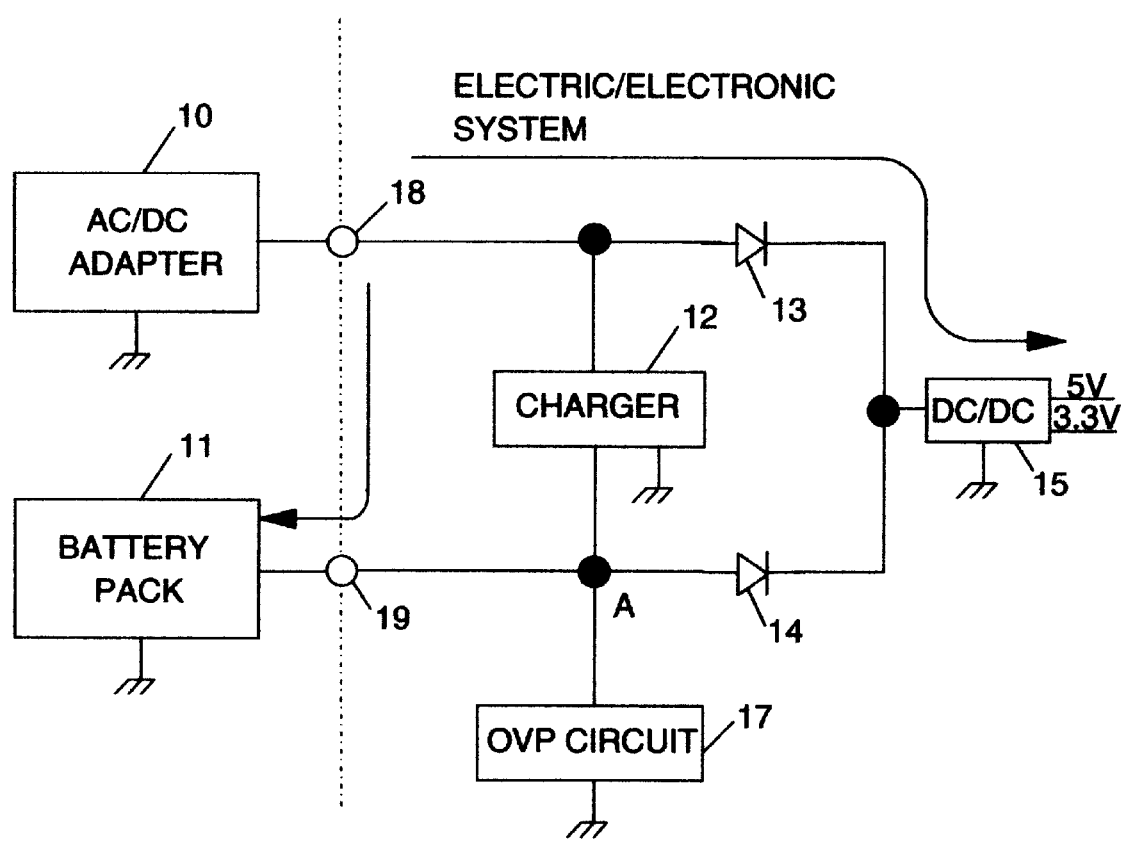
FIG. 4 is a block diagram showing the construction of the power source circuit of the prior electric/electronic circuit.

The relationship of the predetermined current value $I_{th}$ and the current which burns the fuse F1 off is shown in the FIG. 3. FIG. 3 shows a characteristic curve of the burn off of the fuse F1, in which a vertical axis represents a value of current, and a horizontal axis represents a time. A thick line in the FIG. 3 represents the characteristic curve of the burn off of the fuse F1, and, as one example, the fuse F1 is so designed that the fuse F1 is burned off when the current of 5A flows during a period of 10 sec. The characteristic curve of the current value $I_{th}$ shown by a dotted line in the FIG. 3 is so designed that the curve of the $I_{th}$ has values of the current and time which are less than that of the thick curve. Accordingly, when the discharge current $I_{discharge}$ reaches a value equal to or larger than the predetermined current value $I_{th}$, the FET1 and the FET2 are turned off before the fuse F1 is burned off. In an actual case, it is possible to directly compare the discharge current $I_{discharge}$ with the predetermined current value $I_{th}$.

Referring to the FIG. 2 again, the FET control circuit 22 determines as to whether the battery pack 20 is disconnected from the electric/electronic apparatus, or not, in the step ST4, and when the battery pack 20 is disconnected from the electric/electronic apparatus, the FET control circuit 22 performs a reset operation to turn the FET1 and the FET2 on to return the battery pack 20 to a normal state. The FET control circuit 22 can make the determination as to whether the battery pack 20 is disconnected, or not, by detecting an on/off state of a switch or the state of the communication terminal 43 representing the connection of the battery pack 20. Although the above reset operation is performed when the battery pack 20 is disconnected from the electric/electronic apparatus in the present embodiment, another scheme can be used in which the battery pack 20 can be provided with a reset switch, and the above reset operation can be made when the battery pack 20 is disconnected from the apparatus and the reset switch is depressed.

When the above overvoltage protection operation is made again, after the battery pack 20 is connected to the electric/electronic apparatus, a probability of repairing the electric/electronic apparatus in the service center is increased, but in the case that the battery pack 20 normally operates, the battery pack 20 can be continuously used.

As described hereinbefore, the prior art battery pack for the Lithium ion battery is provided with a circuit for preventing the excess charge/discharge which corresponds to the above FET1, the FET2, the voltage converting resistor R2 and the FET control circuit. The prior art battery pack merely turns the FET1 off at the charging current protection, and merely turns the FET2 off at the discharge current protection, and hence the prior art battery pack does not realize the meritorious effects described with respect to the embodiment of the present invention.

For example, in the prior art battery pack, even if it can be possible to assume to turn the FET2 off before the burn off of the fuse F1, the battery cells 21 can be charged from the electric/electronic apparatus side as far as the FET1 is turned on, so that there still exists the probability of overcharging the battery cells 21. The present invention relates to the control of the FET1 and the FET2, the purpose of which is to avoid the exchange of the fuse F1 contained in the electric/electronic apparatus as much as possible, to decrease the probability of repairing the electric/electronic apparatus in the service center and to prevent the battery pack 20 from being applied with the overvoltage, rather than the charge/discharge preventing control in the battery pack. Accordingly, the present invention is characterized in that the FET1 and the FET2 are so controlled that the FET2 is turned off before the fuse F1 in the electric/electronic apparatus is burned off, and the FET1 is substantially simultaneously turned off with the turn off of the FET2 as shown in the flow chart in FIG. 2. By this control scheme, the overvoltage protection (OVP) can be made with an appropriate current for the battery pack, without burning the fuse F1 off.

As described hereinbefore, the battery pack 20 of the present invention comprises the battery cell 21 such as the Lithium ion secondary battery, the charge current preventing FET1 or switch, the discharge current preventing FET2 or switch, the discharge current detecting resistor R2, and the FET control circuit for controlling the FET1 and the FET2, and is characterized in that the FET control circuit 22 detects the amplitude of the current flowing through the battery cells 21 based upon the voltage across the resistor R2, and turns the discharge current preventing FET2 and the charge current preventing FET1 off when the value of the discharge current $I_{discharge}$ increases to a value which is equal to or larger than the predetermined voltage $I_{th}$, whereby it is possible to reliably prevent the charge current from being supplied to the battery pack 20 without burning the fuse F1 off in the electric/electronic apparatus, and to prevent the battery pack 20 from being applied with the overvoltage.

Accordingly, since it is possible to prevent the application of the overvoltage at the side of the battery pack 20 without burning the fuse F1 off in the case that a momentary overvoltage is generated due to a cause such as a momentary contact of a solder ball or other electrically conductive particles to the terminal portions, the meritorious effects, that is, the cases for sending the electric/electronic apparatus to the service center for changing the fuse F1, are remarkably decreased, can be realized, whereby the labor works at the user and the service center can be remarkably decreased. Also, since the large current for burning the fuse F1 off which was required in the prior scheme is not flowed in the circuit of the present invention, the battery cells 21 are not adversely affected.

Although the present invention is described by using the embodiment in which the Lithium ion battery pack is used, the present invention can be applied to any battery source of the battery pack type. Also, although the FET1 and the FET2 are substantially simultaneously turned off in the described embodiment, as shown in sequence in the flow chart of FIG. 2 it is noted that this control scheme is one example. Any scheme can be used in which the flow of the charge current is stopped to prevent the overvoltage from being applied to the battery pack before the start of the operation of the OVP circuit for burning the fuse off included in the electric/electronic apparatus, which requires the repair of the electric/electronic apparatus.

The type and the number of the battery pack, and the FETs and the electric circuit constituting the OVP circuit are not limited to that used in the described embodiment. In the battery pack in accordance with the present invention, the electric circuit of the battery pack turns the discharge preventing switch and the charge preventing switch off when the overvoltage is applied to the battery pack and the discharge current due to the overvoltage is detected. The battery pack is connected to the electric/electronic apparatus containing the overvoltage preventing circuit which detects that the battery pack is applied with the overvoltage, and which burns the fuse off by the discharge current from the battery pack to prevent the battery pack from being applied with the charge current. The battery pack in accordance with the present invention is characterized in that the value of the discharge current detected based upon the overvoltage for turning the discharge preventing switch and the charge preventing switch off in the battery pack is selected lower than the value of the discharge current for burning the fuse off in the electric/electronic apparatus by a predetermined value, whereby the application of the overvoltage to the battery pack can be reliably prevented without burning the fuse off contained in the electric/electronic apparatus, to prevent the battery pack from receiving an undesirable influence.

What is claimed is:

1. A battery pack comprising:

a battery cell capable of being charged and discharged;

an electric circuit for controlling the charge and the discharge of the battery cell;

a charge preventing switch controlled by the electric circuit for preventing a charge current from flowing into the battery cell;

a discharge preventing switch controlled by the electric circuit for preventing a discharge current from flowing from the battery cell; and detecting means for detecting the discharge current are integrally packaged, the electric circuit being operable to turn both the discharge preventing switch off and the charge preventing switch off as a function of an overvoltage being applied to the battery pack and a discharge current based upon the overvoltage being detected by the detecting means.

2. The battery pack according to claim 1, wherein the charge preventing switch is a FET and the discharge preventing switch is a FET.

3. An electric/electronic apparatus mounted with the battery pack of claim 1 comprising:

an overvoltage preventing circuit for detecting a supply of an overvoltage to the battery pack and preventing the burning of a fuse by supplying a discharge current from the battery pack to the fuse at the detection of the overvoltage to prevent the battery pack from being charged and to prevent the burning of the fuse;

a value of the discharge current for burning the fuse being larger than a value of the discharge current detected by the battery pack based upon the overvoltage by a predetermined value.

4. The battery pack according to claim 2, wherein the charge preventing switch FET and the discharge preventing switch FET are both current carrying FETs.

5. The battery pack according to claim 1, wherein the electric circuit for controlling the charge and the discharge of the battery cell is a controller using a microprocessor for executing programs.

* * * * *